US007034746B1

(12) United States Patent
McMakin et al.

(10) Patent No.: US 7,034,746 B1
(45) Date of Patent: Apr. 25, 2006

(54) HOLOGRAPHIC ARRAYS FOR THREAT DETECTION AND HUMAN FEATURE REMOVAL

(75) Inventors: Douglas L. McMakin, Richland, WA (US); David M. Sheen, Richland, WA (US); Thomas E. Hall, Kennewick, WA (US); Wayne M Lechelt, West Richland, WA (US); Ronald H. Severtsen, Richland, WA (US)

(73) Assignee: Bettelle Memorial Institute, Richland, WA (US)

( * ) Notice: Subject to any disclaimer, the term of this patent is extended or adjusted under 35 U.S.C. 154(b) by 0 days.

(21) Appl. No.: 11/088,555

(22) Filed: Mar. 24, 2005

(51) Int. Cl.
*G01S 13/89* (2006.01)
*G01S 13/88* (2006.01)

(52) U.S. Cl. ...................... 342/179; 342/22; 342/25 R; 342/25 A; 342/175; 342/176; 342/188; 342/195

(58) Field of Classification Search .................. 342/21, 342/22, 25 R–25 F, 175, 176, 179, 188, 190–197, 342/351, 361–366
See application file for complete search history.

(56) References Cited

U.S. PATENT DOCUMENTS 3,755,810 A * 8/1973 Latham et al. .............. 342/188
4,829,303 A * 5/1989 Zebker et al. ............ 342/25 A
4,910,523 A * 3/1990 Huguenin et al. .......... 342/179
5,047,783 A * 9/1991 Hugenin ..................... 342/179
5,073,782 A * 12/1991 Huguenin et al. .......... 342/179
5,227,797 A * 7/1993 Murphy ........................ 342/22
5,227,800 A * 7/1993 Huguenin et al. .......... 342/179
5,859,609 A * 1/1999 Sheen et al. ................ 342/179

FOREIGN PATENT DOCUMENTS

GB 2083715 A * 3/1982

* cited by examiner

*Primary Examiner*—Bernarr E. Gregory
(74) *Attorney, Agent, or Firm*—Douglas E. McKinley, Jr.

(57) ABSTRACT

A method and apparatus to remove human features utilizing at least one transmitter transmitting a signal between 200 MHz and 1 THz, the signal having at least one characteristic of elliptical polarization, and at least one receiver receiving the reflection of the signal from the transmitter. A plurality of such receivers and transmitters are arranged together in an array which is in turn mounted to a scanner, allowing the array to be passed adjacent to the surface of the item being imaged while the transmitter is transmitting electromagnetic radiation. The array is passed adjacent to the surface of the item, such as a human being, that is being imaged. The portions of the received signals wherein the polarity of the characteristic has been reversed and those portions of the received signal wherein the polarity of the characteristic has not been reversed are identified. An image of the item from those portions of the received signal wherein the polarity of the characteristic was not reversed is then created.

13 Claims, 8 Drawing Sheets

HOLOGRAPHIC ARRAYS FOR THREAT DETECTION AND HUMAN FEATURE REMOVAL

BACKGROUND OF THE INVENTION

Modern security systems are needed that can quickly screen personnel for concealed weapons prior to entering, airports, train stations, embassies, and other secure buildings and locations. Conventional screening technologies typically rely almost entirely on metal detectors to scan personnel for concealed weapons and x-ray systems to screen hand-carried items. This approach can be reasonably effective for metal handguns, knives, and other metal weapons, but clearly will not detect explosives or other non-metallic weapons.

Active and passive millimeter-wave imaging systems have been demonstrated to detect a wide variety of concealed threats including explosives, handguns, and knives. Examples of such systems are found in the following references. The entire text of these references, and all other papers, publications, patents, or other written materials disclosed herein are hereby incorporated into this specification in their entirety by this reference.

1. Sheen, D. M., D. L. McMakin, and T. E. Hall, *Three-dimensional millimeter-wave imaging for concealed weapon detection*. IEEE Transactions on Microwave Theory and Techniques, 2001. 49(9): p. 1581–92.
2. Sheen, D. M., et al., *Concealed explosive detection on personnel using a wideband holographic millimeter-wave imaging system*. Proceedings of the SPIE—AEROSENSE Aerospace/Defense Sensing and Controls, 1996. 2755: p. 503–13.
3. McMakin, D. L., et al. *Detection of Concealed Weapons and Explosives on Personnel Using a Wide-band Holographic Millimeter-wave Imaging System. in American Defense Preparedness Association Security Technology Division Joint Security Technology Symposium.* 1996. Williamsburg, Va.
4. McMakin, D. L., et al., *Wideband, millimeter-wave, holographic weapons surveillance system*. Proceedings of the SPEE—EUROPTO European symposium on optics for environmental and public safety, 1995. 2511: p. 131–141.
5. Sinclair, G. N., et al., *Passive millimeter-wave imaging in security scanning*. Proc. SPIE, 2000. 4032: p. 40–45.
6. Sheen, D. M., D. L. McMakin, and T. E. Hall, *Combined illumination cylindrical millimeter-wave imaging technique for concealed weapon detection*. Proceedings of the SPIE—Aerosense 2000: Passive Millimeter-wave Imaging Technology IV, 2000. 4032.
7. Sheen, D. M., D. L. McMakin, and T. E. Hall, *Cylindrical millimeter-wave imaging technique for concealed weapon detection*. Proceedings of the SPIE—26th AIPR Workshop:Exploiting new image sources and sensors, 1997. 3240: p. 242–250.
8. McMakin, D. L. and D. M. Sheen. *Millimeter-wave high-resolution holographic surveillance systems*. in *AAAE Airport Security Technology Conference*. 1994. Atlantic City, N.J.: AAAE.
9. McMakin, D. L., et al., *Cylindrical holographic imaging system privacy algorithm final report*. 1999, Pacific Northwest National Laboratory: Richland, Wash.
10. Keller, P. E., et al., *Privacy algorithm for cylindrical holographic weapons surveillance system*. IEEE Aerospace and Electronic Systems Magazine, 2000. 15(2): p. 17–24.
11. Michelson, D. G. and I. G. Cumming, *A calibration algorithm for circular polarimetric radars*. Journal of Electromagnetic Waves and Applications, 1997. 11: p. 659–674.
12. Yueh, S. and J. A. Kong, *Calibration of polarimetric radars using in-scene reflectors*. Journal of Electromagnetic Waves and Applications, 1990. 4(1): p. 27–48.
13. Fujita, M., et al., *Polarimetric calibration of the SIR-C C-Band channel using active radar calibrators and polarization selective dihedrals*. IEEE Transactions on Geoscience and Remote Sensing, 1998. 36(6): p. 1872–1878.
14. U.S. Pat. No. 5,859,609 "Real-Time Wideband Cylindrical Holographic System" issued Jan. 12, 1999 to Sheen et al.
15. U.S. Pat. No. 6,507,309 "Interrogation of an Object for Dimensional and Topographical Information" issued Jan. 14, 2003 to McMakin et al.
16. U.S. Pat. No. 6,703,964 "Interrogation of an Object for Dimensional and Topographical Information" issued Mar. 9, 2004 to McMakin et al.
17. U.S. patent application Ser. No. 10/607,552, "Concealed Object Detection," filed Jun. 26, 2003, now U.S. Pat. No. 6,876,322.
18. U.S. patent application Ser. No. 10/697,848, "Detecting Concealed Objects at a Checkpoint," filed Oct. 30, 2003.

Active millimeter-wave imaging systems operate by illuminating the target with a diverging millimeter-wave beam and recording the amplitude and phase of the scattered signal over a wide frequency bandwidth. Highly efficient Fast Fourier Transform (FFT) based image reconstruction algorithms can then mathematically focus, or reconstruct, a three-dimensional image of the target as described in Sheen, D. M., D. L. McMakin, and T. E. Hall, *Three-dimensional millimeter-wave imaging for concealed weapon detection*. IEEE Transactions on Microwave Theory and Techniques, 2001. 49(9): p. 1581–92. Millimeter-waves can readily penetrate common clothing materials and are reflected from the human body and any concealed items, thus allowing an imaging system to reveal concealed items. Passive millimeter-wave imaging systems operate using the natural millimeter-wave emission from the body and any concealed items. These systems use lenses or reflectors to focus the image, and rely on temperature and/or emissivity contrast to form images of the body along with any concealed items. In indoor environments passive systems often have low thermal contrast, however, active illumination has been demonstrated to improve the performance of these systems. Active millimeter-wave imaging systems have several advantages over passive systems including elimination of bulky lenses/reflectors, high signal-to-noise ratio operation, and high contrast for detection of concealed items. In addition to millimeter-wave imaging systems, backscatter x-ray systems have also been developed for personnel screening. These systems can be very effective, however, they are bulky and may not be well-received by the public due to their use of ionizing radiation (even though they operate at low x-ray levels).

Active, wideband, millimeter-wave imaging systems have been developed for personnel screening applications. These systems utilize electronically controlled, sequentially switched, linear arrays of wideband antennas to scan one axis of a two-dimensional aperture. A high-speed linear mechanical scanner is then used to scan the other aperture axis. The microwave or millimeter-wave transceiver is coupled to the antenna array using a network of microwave/millimeter-wave switches. Amplitude and phase reflection data from the transceiver are gathered over a wide frequency bandwidth and sampled over the planar aperture. These data are then focused or reconstructed using a wideband, three-dimensional, image reconstruction algorithm. The resolution of the resulting images is diffraction-limited, i.e. it is limited only by the wavelength of the system, aperture size, and range to the target and is not reduced by the reconstruction process. Preferred algorithms make extensive use of one, two, and three-dimensional FFT's and are highly efficient. Imaging systems utilizing a planar, rectlinear aperture are restricted to a single view of the target. To overcome this limitation, a cylindrical imaging system has been developed. This system utilizes a vertical linear array that has its antennas directed inward and is electronically sequenced in the vertical direction and mechanically scanned around the person being screened. Data from this system can be reconstructed over many views of the target creating an animation of the imaging results in which the person's image rotates.

All imaging systems proposed for personnel screening have raised objections about invasion of personal privacy due to the revealing nature of the images that are generated by the systems. Accordingly, there is a need for new imaging techniques that highlight concealed objects, and/or suppress natural body features in the images.

BRIEF SUMMARY OF THE INVENTION

Accordingly, it is an object of the present invention to provide a method and apparatus to remove human features from the image produced in an imaging system having at least one transmitter transmitting electromagnetic radiation between 200 MHz and 1 THz, and at least one receiver receiving the reflective signal from said transmitter. These and other objects of the present invention are accomplished by transmitting a signal having at least one characteristic of elliptical polarization from at least one transmitter that transmits electromagnetic radiation between 200 MHz and 1 THz. Preferably, but not meant to be limiting, a plurality of such receivers 1 and transmitters 2 are arranged together in an array 3 which is in turn mounted to a scanner 4 as shown in FIG. 8, allowing the array 3 to be passed adjacent to the surface of the item 5 being imaged while the transmitter 2 is transmitting electromagnetic radiation. The array 3 is passed adjacent to the surface of the item 5, such as a human being, that is being imaged, preferably, but not meant to be limiting, either by configuring the scanner to circle the array around the surface of the item, or to move the array in a rectilinear plane parallel to the surface of the item. The reflection of the transmitted signal is then received with one or more receivers 1. The present invention then provides a computer 6 in communication with the receivers 1. The present invention is configured to identify those portions of the received signals wherein the polarity of the characteristic has been reversed, and those portions of the received signal wherein the polarity of the characteristic has not been reversed. As used herein the "characteristic" of the polarity refers to the handedness of the elliptical polarization determined directly from the transceiver or synthesized mathematically from fully-polarimetric data. Preferably, but not meant to be limiting, the present invention utilizes a fully polarimetric configuration. As used herein fully-polarimetric means a set of measurements that allow the polarization altering properties of any reflecting target to be determined. A fully-polarimetric linearly polarized system is typically comprised of linearly polarized measurements consisting of all four combinations transmit and receive polarizations including HH, HV, VH, and VV where H is used to indicate horizontal polarization, V is used to indicate vertical polarization, the first letter indicates the transmit antenna polarization, and the second letter indicates the receive antenna polarization. A fully polarimetric circularly polarized system is typically comprised of circularly polarized measurements consisting of all four combinations transmit and receive polarizations including LL, LR, RL, and RR where L is used to indicate left-hand circular polarization (LHCP), R is used to indicate right-hand circular polarization (RHCP), the first letter indicates the transmit antenna polarization, and the second letter indicates the receive antenna polarization. It should be noted that the fully-polarimetric data in one basis (e.g. linear) can be mathematically transformed to another basis (e.g. circular). In addition to linear and circular polarization other independent combinations of elliptical polarization could, in principle, be used to form a fully polarimetric set. It should also be noted that for some targets it may only be necessary to gather three of the four measurements as the diagonal terms (e.g. HV and VH or LR and RL) may be expected to be identical. As those having ordinary skill in the art will recognize, in many cases it will not be necessary to utilize a fully-polarimetric configuration to determine whether a characteristic of polarity has been reversed. Accordingly, the fully-polarimetric should be understood to encompass any and all configurations that allow the identification of a change of a characteristic of polarity of a given signal. The computer is further configured to create an image of the item from those portions of the received signal wherein the polarity of the characteristic was not reversed.

Preferably, but not meant to be limiting, the elliptical polarization is selected as circular polarization. Preferably, but not meant to be limiting, the characteristic of elliptical polarization is selected from the group of right handedness and left handedness. Thus, by way of example, the present invention can utilize transmitters that transmit vertically and horizontally polarized signals and receive both vertically and horizontally polarized signals. Alternately, the present invention can utilize transmitters that transmit left and right handed circularly polarized signals, and receive left and right handed circularly polarized signals. In this manner, for any given transmitted signal, the present invention can detect and identify the state of polarization, and whether the number of reflections that have occurred between transmission and receipt was odd or even. Accordingly, the image constructed from the reflected signal can be limited to only those portions of the reflected signal that have been reflected an even number of times.

DETAILED DESCRIPTION OF THE INVENTION

An experiment was conducted to demonstrate the ability of the present invention to remove human features from an image of a clothed mannequin. Circular polarimetric imaging was employed to obtain additional information from the target, which was then used to remove those features.

Circularly polarized waves incident on relatively smooth reflecting targets are typically reversed in their rotational handedness, e.g. left-hand circular polarization (LHCP) is reflected to become right-hand circular polarization (RHCP). An incident wave that is reflected twice (or any even number) of times prior to returning to the transceiver, has its handedness preserved. Sharp features, such as wires and edges, tend to return linear polarization, which can be considered to be a sum of both LHCP and RHCP. These characteristics are exploited by the present invention by allowing differentiation of smooth features, such as the body, and sharper features such as those that might be present in many concealed items. Additionally, imaging artifacts due to multipath can be identified and eliminated. Laboratory imaging results have been obtained in the 10–20 GHz frequency range and are presented below.

Figure 1:
FIG. 1 is an experimental imaging configuration used in experiments to demonstrate an embodiment of the present invention showing the mannequin on a rotating platform with axis placed 1.0 meter in front of a rectilinear scanner. The transceiver is mounted on the shuttle of the rectilinear scanner.
Figure 2:
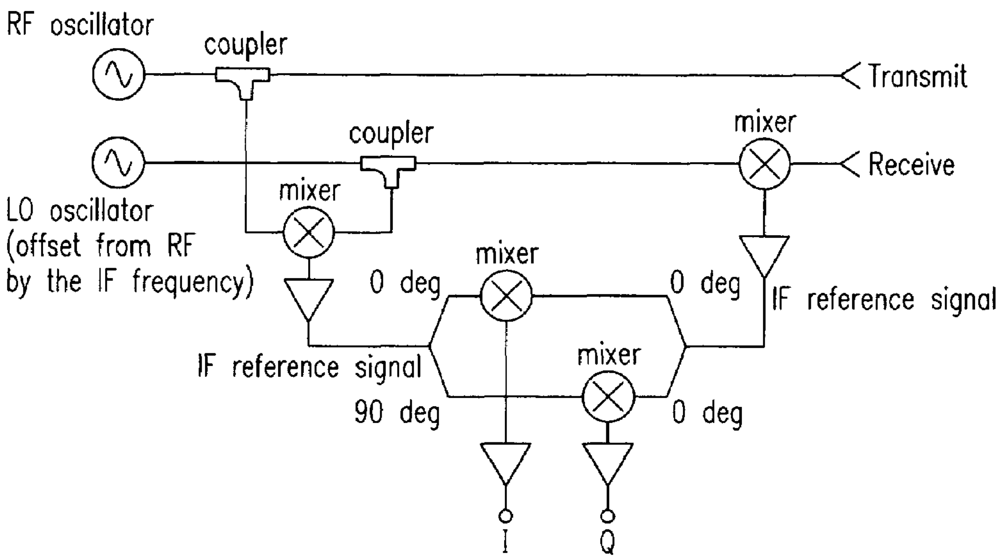
FIG. 2 is schematic diagram of the 10–20 GHz microwave transceiver used in the experimental imaging configuration used in experiments to demonstrate an embodiment of the present invention.

A laboratory imaging system was set up to explore the characteristics of the circular polarization imaging system and obtain imaging results. The experimental imaging configuration used a rotating platform placed in front of a rectlinear (x-y) scanner as shown in FIG. 1. This system emulates a linear array based cylindrical imaging system by mechanically scanning the transceiver (shown on the shuttle of the x-y scanner in FIG. 1) at each rotational angle of rotating platform. The system was set up to operate over the 10–20 GHz frequency range and a simplified schematic of the transceiver is shown in FIG. 2. The transceiver uses two YIG oscillators offset from each other by approximately 300 MHz for the RF and LO oscillators. Directional couplers are used to sample the outputs of both oscillators and a mixer is used to derive an IF reference signal that will be coherent with the IF signal returned from the target. This IF signal is then down-converted in quadrature to obtain the in-phase (I) and quadrature (Q) signals, where $I+jQ=Ae^{j\phi}$ and A is the amplitude and $\phi$ is the phase. The circularly polarized antennas used with the transceiver were cavity backed spiral antennas with a diameter of approximately 6 cm. purchased from Antenna Research Associates, Inc., Beltsville, Md. The axial ratio of these antennas is nominally 1.5 dB and the gain is nominally 1.5 dBi in the 10–20 GHz frequency band. A photograph of the antennas is shown on the left side of FIG. 3. Three antennas were used, two right hand circularly polarized (RHCP) and one left hand circularly polarized (LHCP) antenna. This allows for co-polarized imaging tests using the two RHCP antennas. This configuration is referred to as RR. Using the RHCP antenna to transmit and the LHCP antenna to receive results in the cross-polarized imaging configuration, which is referred to herein as RL. In addition to the circularly polarized antennas, conventional pyramidal waveguide horns were used with the transceiver and imaging system. This allowed for comparison of the circular polarization imaging results with more conventional linear polarized results.

The transceiver was coupled to a data acquisition (analog-to-digital converter) system that was mounted within a Windows XP, Intel Xeon based computer workstation. This computer system was then used to control the scanner system, acquire data, and perform the image reconstructions.

Figure 4:
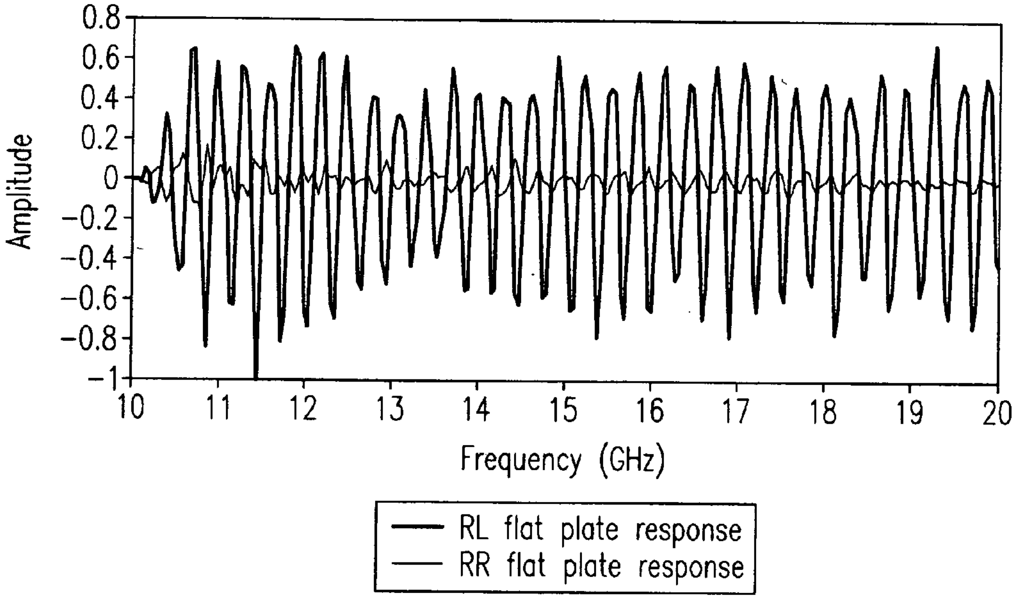
FIG. 4 is a plot of the RL signal returned from a flat plate at 0.5 meters, relative to the RR signal returned from the same target, in the experimental imaging configuration used in experiments to demonstrate an embodiment of the present invention.

One of the primary considerations for using circular polarization is the ability to suppress single (or odd) bounce reflections from double (or even) bounce reflections from the target. This may allow suppression of the body in the images and enhancement of concealed items that protrude from the body. FIG. 4 shows results that test the experimental systems ability to suppress the single-bounce reflections. In this figure, the returned in-phase(I) signal is plotted from 10–20 GHz for a flat plate target placed 0.5 meters from the antennas. Both the cross-polarized (RL) and co-polarized (RR) signals are shown. Note that the co-polarized RR signal amplitude is dramatically reduced compared to the cross-polarized signal. This reduction is nominally 15 dB or higher over most of the band.

Figure 3:
FIG. 3 are photographs of the spiral antennas used for the laboratory imaging measurements (left) and 40 cm letter "F" test target (right) used in experiments to demonstrate an embodiment of the present invention.
Figure 5:
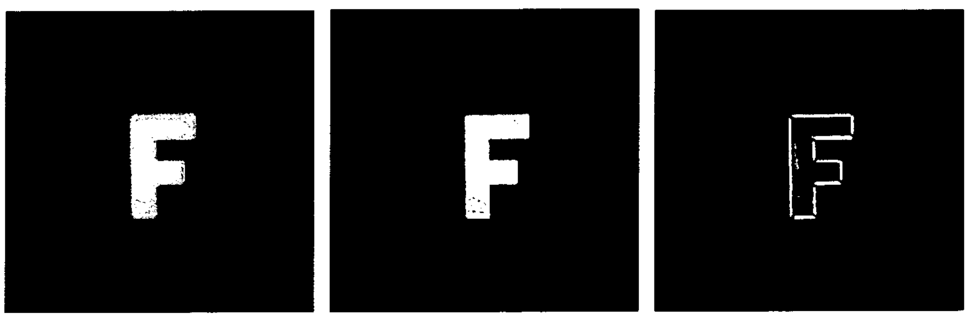
FIG. 5 shows successive images of the 40 cm "F" target at 10–20 GHz using a 1 m by 1 m aperture in the experimental imaging configuration used in experiments to demonstrate an embodiment of the present invention. Shown from left to right are the HH polarization, RL polarization, and RR polarization images.

A flat test target was created using 7.5 cm wide copper tape on 1.25 cm thick styrofoam backing to form a 40 cm high letter "F", which is shown on the right side of FIG. 3. This target was imaged using a planar rectilinear scanner with a 1 meter by 1 meter aperture and a range to the target of 0.5 meters. Results, shown in FIG. 5, include three polarization configurations: linear (horizontal—horizontal or HH), cross-polarized circular (RL), and co-polarized circular (RR). The HH image shows a very uniform return from all portions of the target with slight blurring of the edges due to the finite resolution of the system (nominally 1.0 cm at 15 GHz). The RL image is similar, but the edges are better defined. This is due to the wider beamwidth of the spiral antennas which results in higher resolution for the imaging system. The most interesting results are the co-polarized RR results shown on the right in FIG. 5. The overall amplitude of the image has been reduced dramatically (approximately 15 dB), due to the suppression of the single bounce reflection. In addition, the edges of the target are brightened, or enhanced. This is caused by the electric field enhancement along the edges of the target which results in a linear polarization return from each edge. Since linear polarization can be considered to be a superposition of RHCP and LHCP it is detected by the co-polarized antennas. This edge enhancement is not apparent in the HH or RL images in FIG. 5 since it is relatively small compared to the single-bounce reflection in those images.

Figure 6:
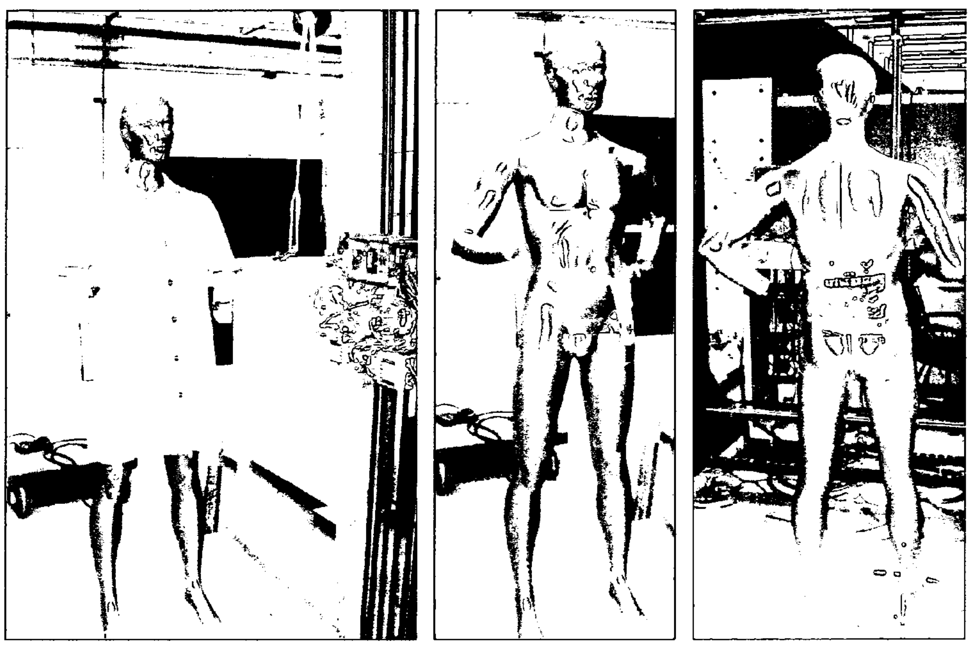
FIG. 6 shows photographs of clothed and unclothed mannequin with a concealed metal handgun (on the abdomen) and simulated plastic explosive (on the lower back) used in the experimental imaging configuration in experiments conducted to demonstrate an embodiment of the present invention.

A metallized mannequin was used for imaging tests in these experiments. This mannequin is shown clothed in a laboratory coat and unclothed carrying a concealed handgun and simulated plastic explosive in FIG. 6. The axis of the rotary platform was placed at a range of 1.0 meters from the antenna phase center to form a cylindrical scanner with 1.0 meter radius. The vertical scan consisted of a 1.36 meter length with 256 samples. The angular scan consisted of 1.25 revolutions and 1280 samples. The frequency range was 10–20 GHz using 256 frequency samples.

Figure 7:
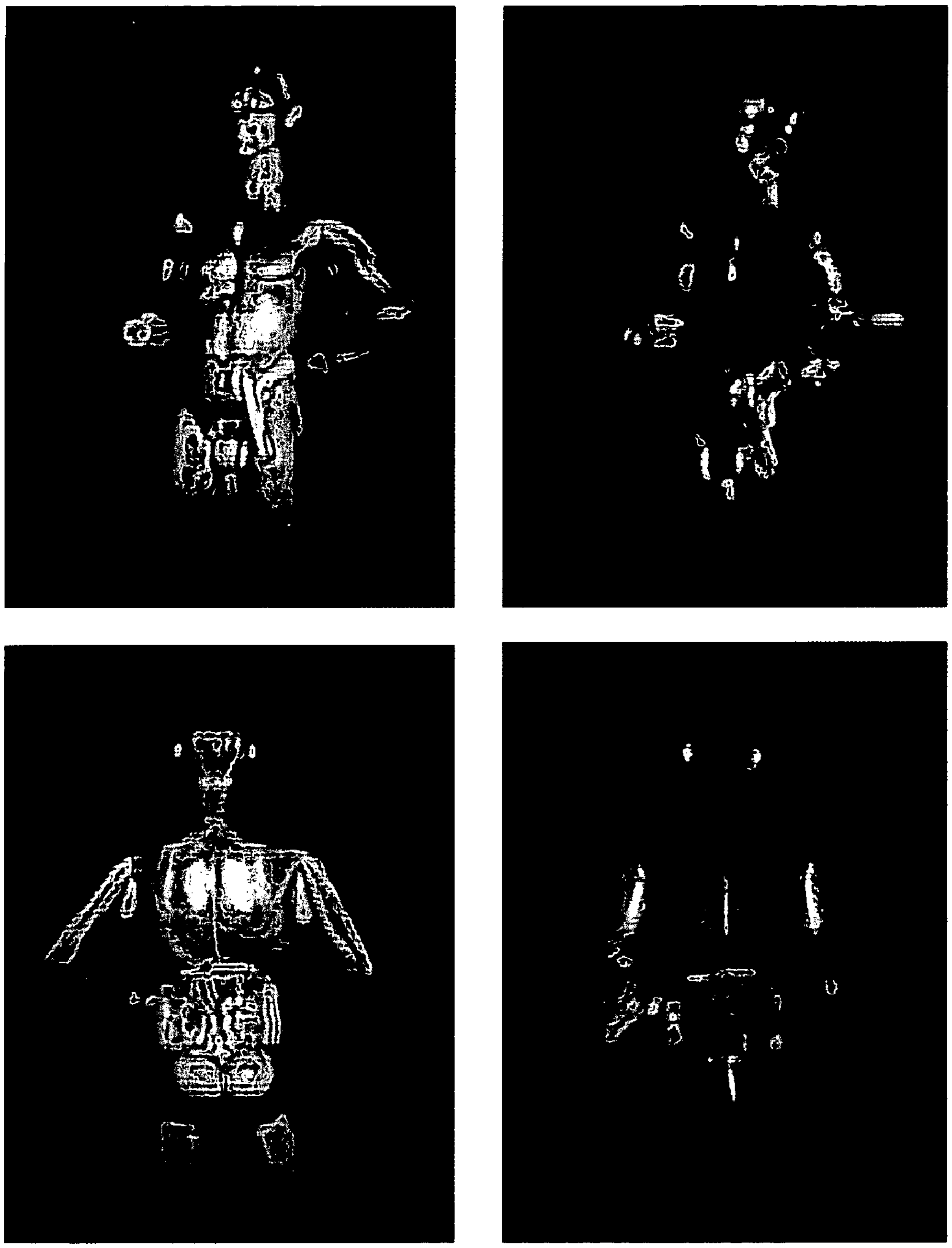
FIG. 7 shows 10–20 GHz imaging results from the mannequin of FIG. 6 with a concealed metal handgun (on the abdomen) and simulated plastic explosive (on the lower back). Left side images are HH polarization and right side images are RR polarization.
Figure 8:
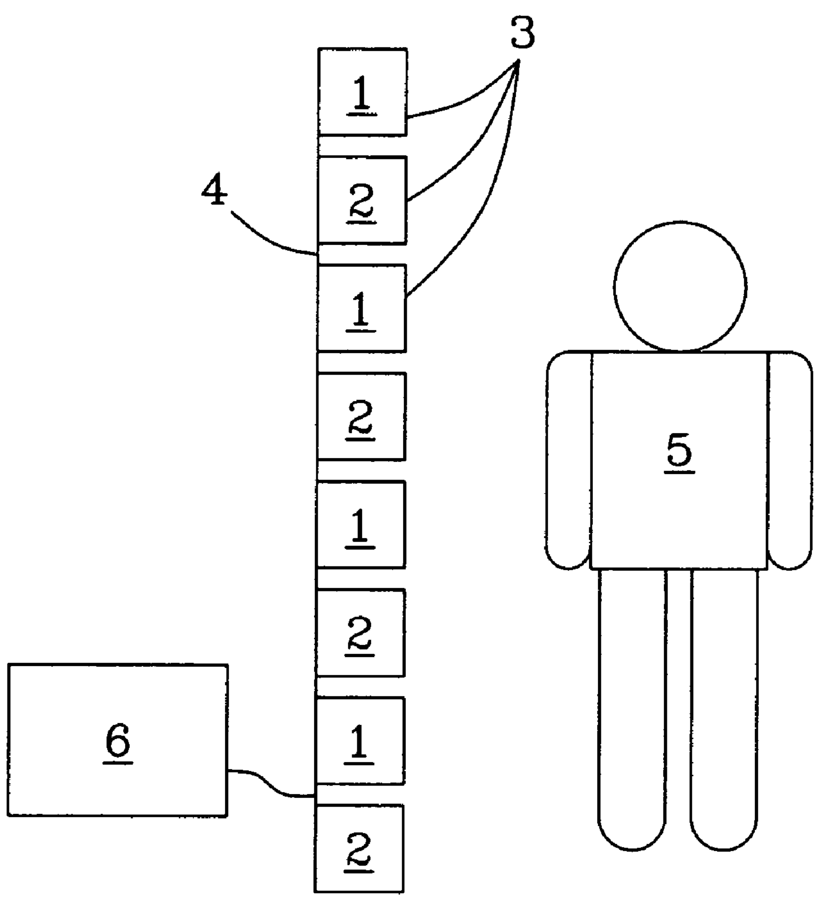
FIG. 8 shows a schematic drawing of one embodiment of the present invention showing the a plurality of such receivers and transmitters arranged together in an array which is in turn mounted to a scanner and connected to a computer.

Imaging results from a clothed mannequin carrying a concealed handgun and simulated plastic explosive (as depicted in the photographs in FIG. 6) are shown in FIG. 7. Images were obtained using 90 degree arc segments of cylindrical data centered at 64 uniformly spaced angles ranging from 0 to 360 degrees with sample images shown at approximately 30 and 180 degrees in the figure. Two polarization combinations were imaged using otherwise identical experimental parameters. The HH images are shown on the left side of FIG. 7 and RR images on the right. The concealed weapons in the RR images are enhanced in the RR images. The edges of the concealed handgun are highlighted in the RR images due to the dihedral (double-bounce) reflection formed around the perimeter of the handgun as placed on the body of the mannequin. Similarly, the edges of the simulated plastic explosive are highlighted in the RR image of the back of the mannequin. In contrast, the human features of the mannequin are removed or suppressed as shown in the images on the right.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method to remove human features in an imaging system having at least one transmitter transmitting electromagnetic radiation between 200 MHz and 1 THz and at least one receiver receiving the reflective signal from said transmitter comprising the steps of:

a. transmitting a signal having at least one characteristic of elliptical polarization towards an item, b. receiving a reflection of said signal, c. identifying those portions of said received signal wherein the polarity of said characteristic is reversed and those portions of said received signal wherein the polarity of said characteristic is not reversed, d. creating an image from those portions of said received signal wherein the polarity of said characteristic is not reversed.

2. The method of claim 1 wherein said elliptical polarization is circular polarization.

3. The method of claim 1 wherein said characteristic is selected from the group of right handedness and left handedness.

4. The method of claim 1 wherein said signal is fully-polarimetric.

5. The method of claim 1 wherein a plurality of receivers and transmitters are arranged in an array and are passed adjacent to the surface of the item being imaged.

6. The method of claim 5 wherein said the step of passing the array adjacent to the surface of the item being imaged is selected from the group of circling the array around the surface of said item, and moving the array in a rectilinear plane parallel to the surface of said item.

7. An imaging system comprising:

a. at least one transmitter configured to transmit electromagnetic radiation at an item between 200 MHz and 1 THz and having at least one characteristic of elliptical polarization, b. at least one receiver capable of receiving at least one characteristic of elliptical polarization from a reflected signal from said transmitter, c. a computer configured to identify those portions of said received signal wherein the polarity of said characteristic is reversed and those portions of said received signal wherein the polarity of said characteristic is not reversed, and create an image from those portions of said received signal wherein the polarity of said characteristic is not reversed.

8. The imaging system of claim 7 wherein said elliptical polarization is circular polarization.

9. The imaging system of claim 7 wherein said characteristic is selected from the group of right handedness and left handedness.

10. The imaging system of claim 7 wherein said signal is fully-polarimetric.

11. The imaging system of claim 7 wherein a plurality of receivers and transmitters are arranged in an array and are mounted on a scanner capable of passing the array adjacent to the surface of the item being imaged.

12. The imaging system of claim 11 wherein the scanner is capable of rotating the array around the surface of said item.

13. The imaging system of claim 11 wherein the scanner is capable of passing the array in a rectilinear plane parallel to the surface of said item.

* * * * *